United States Patent
Negishi et al.

(10) Patent No.: US 7,031,317 B2
(45) Date of Patent: Apr. 18, 2006

(54) TRANSMISSION APPARATUS AND TRANSMISSION METHOD

(75) Inventors: Shinji Negishi, Kanagawa (JP); Hideki Koyanagi, Kanagawa (JP); Yoichi Yagasaki, Tokyo (JP)

(73) Assignee: Sony Corporation, (JP)

( * ) Notice: Subject to any disclaimer, the term of this patent is extended or adjusted under 35 U.S.C. 154(b) by 1116 days.

(21) Appl. No.: 09/931,923

(22) Filed: Aug. 20, 2001

(65) Prior Publication Data

US 2002/0024952 A1    Feb. 28, 2002

(30) Foreign Application Priority Data

Aug. 21, 2000   (JP)   .......................... P2000-250377

(51) Int. Cl.
  *H04L 12/28*   (2006.01)
  *H04L 12/56*   (2006.01)
(52) U.S. Cl. .................... 370/395.2; 370/231; 370/486
(58) Field of Classification Search ............ 370/395.2, 370/395.21, 395.4, 395.41, 395.42, 229, 370/230, 230.1, 231, 232, 236, 485, 486, 370/487, 488, 394
See application file for complete search history.

(56) References Cited

U.S. PATENT DOCUMENTS

| | | | |
|---|---|---|---|
| 6,965,608 B1 * | 11/2005 | Aiyagari et al. ............ | 370/465 |
| 2001/0007568 A1 * | 7/2001 | Morris ........................ | 370/473 |
| 2001/0015986 A1 * | 8/2001 | Sugimoto et al. ........... | 370/487 |
| 2001/0036193 A1 * | 11/2001 | Kori ............................ | 370/402 |

* cited by examiner

*Primary Examiner*—Brian Nguyen
(74) *Attorney, Agent, or Firm*—Rader, Fishman & Grauer PLLC; Ronald P. Kananen

(57) ABSTRACT

A transmission system is a data delivery system which includes a server for transmitting ES data and a receiving terminal for receiving the transmitted data. The server includes a conversion controller for determining elementary streams (ES's) and a scene description to be transmitted based on transmission priority levels and display priority levels, in accordance with the state of a transmission path and/or a request from the receiving terminal. The server also includes an ES processor and a scene description processor.

13 Claims, 10 Drawing Sheets

| | TRANSMISSION PRIORITY LEVEL | DISPLAY PRIORITY LEVEL | BIT RATE |
|---|---|---|---|
| ESa | 30 | 10 | Ra |
| ESb | 20 | 20 | Rb |
| ESc | 10 | 30 | Rc |

FIG. 6

```
<!doctype html public "-//w3c//dtd html 4.0 transitional//en">
<html>
<head>
    <meta http-equiv="Content-Type" content="text/html; charset=Shift_JIS">
</head>
<body>
<DIV STYLE="position:absolute;left:0px;top:0px">
    <IMG height=220 width=294 src="ESa.gif">
</DIV>
<DIV STYLE="position:absolute;left:296px;top:0px">
    <IMG height=110 width=147 src="ESb.gif">
</DIV>
<DIV STYLE="position:absolute;left:0px;top:222px">
    ESc text contents
</DIV>
</body>
</html>
```

| | TRANSMISSION PRIORITY LEVEL | DISPLAY PRIORITY LEVEL | BIT RATE |
|---|---|---|---|
| ESa | 15 | 25 | Ra' |
| ESb | 20 | 20 | Rb |
| ESc | 10 | 30 | Rc |

TRANSMISSION APPARATUS AND TRANSMISSION METHOD

BACKGROUND OF THE INVENTION

1. Field of the Invention

The present invention relates to transmission apparatuses and transmission methods which are suitable for delivering, via a network or a recording medium, scene description data for forming a scene using multimedia data including still image signals, moving image signals, audio signals, text data, and graphic data, the scene description data being in turn received, decoded, read, and displayed by a receiving terminal.

2. Description of the Related Art

FIG. 15 shows the configuration of a conventional data delivery system for transmitting moving image signals and audio signals through a transmission medium, the signals being in turn received, decoded, and displayed by a receiving terminal. In the following description, a moving image signal or an audio signal which is coded in conformity with the ISO/IEC 13818 standard (so-called MPEG 2) or the like is referred to as an elementary stream (ES).

Referring to FIG. 15, an ES processor 13 of a server 100 selects an ES which is stored beforehand in a storage device 104 or receives a baseband image or an audio signal (not shown) and encodes the ES or the received signal. A plurality of ES's may be selected. If necessary, a transmission controller 105 of the server 100 multiplexes a plurality of ES's and subjects them to transmission coding in accordance with a transmission protocol for transmitting signals over a transmission medium 107. The coded signals are transmitted to a receiving terminal 108.

A reception controller 109 of the receiving terminal 108 decodes the signals transmitted through the transmission medium 107 in accordance with the transmission protocol. If necessary, the transmission controller 109 separates the multiplexed ES's and passes each ES to a corresponding ES decoder 112. The ES decoder 112 decodes the ES, reconstructs the moving image signal or the audio signal, and transmits the reconstructed signal to a display/speaker 113 which includes a television monitor and a speaker. Accordingly, the television monitor displays images, and the speaker outputs sound.

For example, the server 100 is a transmission system of a broadcasting station in broadcasting or an Internet server or a home server on the Internet. For example, the receiving terminal 108 is a receiving apparatus for receiving broadcast signals or a personal computer.

When a transmission bandwidth of a transmission path (transmission medium 107) for transmitting an ES changes or when the state of traffic congestion changes, data to be transmitted may be delayed or lost.

In order to solve the above problems, the data delivery system shown in FIG. 15 performs the following processing.

The server 100 (for example, the transmission controller 105) assigns a serial number (coded serial number) to each packet of data to be transmitted over the transmission path. At the same time, the reception controller 109 of the receiving terminal 108 performs a completeness check to see whether or not there is a missing serial number (coded serial number) assigned to each packet received from the transmission path, thereby detecting data loss (data loss ratio). Alternatively, the server 100 (for example, the transmission controller 105) adds time information (coded time information) to data to be transmitted over the transmission path. At the same time, the reception controller 109 of the receiving terminal 108 monitors the time information (coded time information) added to the data received from the transmission path, thereby detecting transmission delay. The reception controller 109 of the receiving terminal 108 detects the data loss ratio of the transmission path or transmission delay and transmits (reports) the detected information to a transmission state detector 106 of the server 100.

The transmission state detector 106 of the server 100 detects the transmission bandwidth of the transmission path or the traffic congestion state from the data loss ratio of the transmission channel or the information indicating the transmission delay which is transmitted from the reception controller 109 of the receiving terminal 108. Specifically, the transmission state detector 106 determines that the transmission path is congested if the data loss ratio is high. If the transmission delay is increased, the transmission state detector 106 determines that the transmission path is congested. If a reserved-band-type transmission path is used, the transmission state detector 106 can directly detect the free bandwidth (transmission bandwidth) available for the server 100. When a transmission medium such as radio waves which are greatly influenced by climate conditions is used, the transmission bandwidth may be preset by a user in accordance with climate conditions and the like. The information about the transmission state, which is detected by the transmission state detector 106, is transmitted to a conversion controller 101.

Based on the detected information such as the transmission bandwidth of the transmission path or the traffic congestion state, the conversion controller 101 enables the ES processor 103 to select an ES having a different bit rate. When the ES processor 103 performs encoding in compliance with the ISO/IEC 13818 standard (so-called MPEG 2) or the like, the conversion controller 101 adjusts the coding bit rate. In other words, when it is detected that the transmission path is congested, the conversion controller 101 enables the ES processor 103 to output an ES having a low bit rate. Thus, data delay can be avoided.

For example, the system configuration may include an unspecified number of receiving terminals 108 connected to the server 100. When the receiving terminals 108 have different specifications, the server 100 must transmit an ES to the receiving terminals 108 which have various processing capacities. In such a case, the receiving terminals 108 each include a transmission request processor 110. The transmission request processor 110 generates a transmission request signal for requesting an ES which complies with the processing capacity thereof, and the transmission request signal is transmitted from the reception controller 109 to the server 100. The transmission request signal includes a signal that indicates the capacity of the receiving terminal 108 itself. For example, signals which are transmitted from the transmission request processor 110 to the server 100 and which indicate the capacity of the receiving terminal 108 include memory size, resolution of a display, computing capacity, buffer size, coding format of each decodable ES, the number of decodable ES's, bit rate of each decodable ES, and the like. The conversion controller 101 of the server 100 that has received the transmission request signal controls the ES processor 103 so that an ES that complies with the performance of the receiving terminal 108 is transmitted. Concerning an image signal converting process performed by the ES processor 103 to convert the ES so that the ES complies with the performance of the receiving terminal 108, an image signal converting method is proposed by the assignee of the present invention.

In conventional television broadcasting, one scene basically consists of an image (only still image or moving image) and sound. A display screen of a conventional receiving apparatus (television receiving set) displays only images (still images or moving images), and a speaker only outputs sound.

Recently, one scene has been formed using multimedia data including various signals such as still image signals, moving image signals, audio signals, text data, and graphic data. Methods for describing the structure of a scene using such multimedia data include HTML (HyperText Markup Language) used in home pages on the Internet, MPEG-4 BIFS (Binary Format for Scenes) which is a scene description system defined by the ISO/IEC 14496-1 standard, and Java (trademark). In the following description, data that describes the structure of a scene is referred to as a scene description. As in text data in HTML, an ES may be included in a scene description. HTML is defined by the W3C (World Wide Web Consortium) Recommendation.

The conventional data delivery system shown in FIG. 15 can form and display a scene in accordance with the scene description.

However, the conventional scene delivery system is designed to decode and display the scene structure based on the same scene description even when the bit rate of the ES is adjusted in accordance with a change in the transmission bandwidth of the transmission path or a change in the traffic congestion state or in accordance with the performance of the receiving terminal. In other words, the conventional data delivery system performs decoding and display using the same scene structure regardless of the fact that the ES is to be converted by the ES processor 103.

As described above, according to the conventional data delivery system, when the state of the transmission path for transmitting the ES (transmission bandwidth or traffic congestion state) or the processing capacity of the receiving terminal 108 is not sufficient, the bit rate of the ES is adjusted in accordance with the state of the transmission path or the request from the receiving terminal 108 in order to avoid transmission data delay or data loss. Specifically, for example, the ES processor 103 selects an ES having a specific bit rate from among a plurality of ES's having different bit rates. When the ES processor 103 performs coding in compliance with the ISO/IEC 13818 standard (so-called MPEG 2), the coding bit rate is adjusted. Since the conventional data delivery system has neither judgment criteria for selecting a specific ES from among a plurality of ES's nor judgment criteria for adjusting the coding bit rate, an optimal ES cannot be obtained in accordance with the state of the transmission path or the processing capacity of the receiving terminal 108.

When scene description data is to be delivered over a transmission path such as the Internet in which the transmission capacity is variable and the transmission bandwidth varies in accordance with time or the path, or when an unspecified number of receiving terminals are connected to a server and when scene description data is to be delivered to the receiving terminals which have different specifications and various processing capacities, it is difficult for the conventional data delivery system to detect in advance the optimal scene structure for the transmission path and the receiving terminal. When a decoder of the receiving terminal is formed by software, or when the decoder software and the other processing software share a CPU or memory, the processing capacity of the decoder may vary dynamically. In such a case, the conventional data delivery system cannot detect in advance the optimal scene description. In the conventional data delivery system, when converting an ES or selecting and transmitting an ES from among a plurality of ES's in accordance with the state of the transmission path or the request form the receiving terminal 108, the receiving terminal 108 cannot perform display using the optimal scene structure with respect to the ES transmitted from the server 100. Although not shown in FIG. 15, instead of decoding and displaying data delivered through the transmission medium 107, when a decoder/display terminal for reading, decoding, and displaying an ES recorded in a recording medium or a recording device is used, as in the above description, display cannot be performed using the optimal scene structure in accordance with the processing capacity of the decoder/display terminal.

SUMMARY OF THE INVENTION

Accordingly, it is an object of the present invention to provide a transmission apparatus and a transmission method capable of obtaining the optimal ES and the optimal scene description with respect to the state of a transmission path and the processing capacity of a receiving terminal, detecting in advance the optimal scene description even if the processing capacity of a decoder of the receiving terminal dynamically changes, enabling the receiving terminal to display a scene with the optimal scene structure in response to a transmitted ES, and enabling a decoder/display terminal which reads an ES from a recording medium or a recording device and which decodes and displays the read ES to display a scene with the optimal scene structure in accordance with the processing capacity of the decoder/display terminal.

According to an aspect of the present invention, a transmission apparatus is provided for transmitting to a receiving apparatus at least two different signals and a scene description which describes a scene formed of at least two different signals. The transmission apparatus includes a maintaining unit for maintaining priority level information indicating transmission priority levels with respect to the at least two different signals; a determining unit for determining, in accordance with the state of a transmission path and/or a request from the receiving apparatus, signals to be transmitted based on the priority level information; and scene description converting unit for converting the scene description in accordance with the signals to be transmitted.

The determining unit may determine the signals to be transmitted in descending order of the priority levels.

The scene description converting unit may convert the scene description so that a larger display region and/or a more highly preferential display position is assigned to the signals to be transmitted in descending order of the priority levels.

The transmission apparatus may further include a priority level determining unit for determining the priority level of each of the at least two different signals in accordance with the type of signal.

The determining unit may determine only the signal that complies with the processing capacity of the receiving apparatus based on the priority level information.

The maintaining unit may also maintain information indicating display priority levels with respect to the at least two different signals.

According to another aspect of the present invention, a transmission method is provided for transmitting to a receiving apparatus at least two different signals and a scene description which describes a scene formed of at least two different signals. The transmission method includes a maintaining step of maintaining, in a memory, priority level information indicating transmission priority levels with respect to the at least two different signals; a determining step of determining, in accordance with the state of a transmission path and/or a request from the receiving apparatus, signals to be transmitted based on the priority level information; and a scene description converting step of converting the scene description in accordance with the signals to be transmitted.

In the determining step, the signals to be transmitted may be determined in descending order of the priority levels.

In the scene description converting step, the scene description may be converted so that a larger display region and/or a more highly preferential display position is assigned to the signals to be transmitted in descending order of the priority levels.

The transmission method may further include a priority level determining step of determining the priority level of each of the at least two different signals in accordance with the type of signal.

In the determining step, only the signal that complies with the processing capacity of the receiving apparatus may be determined based on the priority level information.

The memory may also maintain information indicating display priority levels with respect to the at least two different signals.

According to yet another aspect of the present invention, a transmission system is provided including a transmission apparatus for transmitting at least two different signals and a scene description which describes a scene formed of at least two different signals; and a receiving apparatus for receiving the transmitted data. The transmission apparatus includes a maintaining unit for maintaining priority level information indicating transmission priority levels with respect to the at least two different signals; a determining unit for determining, in accordance with the state of a transmission path or a request from the receiving apparatus, signals to be transmitted based on the priority level information; and a scene description converting unit for converting the scene description in accordance with the signals to be transmitted. The receiving apparatus includes a forming unit for forming a scene based on the received signals and the scene description.

According to the present invention, when data formed of at least one signal is to be transmitted, and when the transmitted data is to be received, a transmission apparatus determines and transmits at least one signal to be transmitted based on a predetermined priority level in accordance with the state of a transmission path and/or a request from a receiving apparatus. Alternatively, the transmission apparatus in transmission adds priority level information regarding display with data to be transmitted and transmits the data. The receiving apparatus forms a scene in which a higher display region and/or a more preferential display position is assigned to the at least one signal in descending order of the priority levels. Alternatively, the receiving apparatus uses the transmitted at least one signal and forms a scene in accordance with the predetermined priority level. It is thus possible to obtain the optimal signal and the optimal scene structure in accordance with the state of the transmission path or the processing capacity of the receiving apparatus. Even when the processing capacity of a decoder of the receiving apparatus dynamically changes, it is possible to obtain in advance the optimal scene description. Also, the receiving apparatus can display a transmitted signal with the optimal scene structure. When decoding and displaying a signal read from a recording medium, a decoder/display apparatus can display a scene with the optimal scene structure in accordance with the processing capacity of the decoder/display apparatus.

BRIEF DESCRIPTION OF THE DRAWINGS

FIG. 6 illustrates an example of a scene description which describes the scene structure shown in FIG. 3 by using HTML format;

DESCRIPTION OF THE PREFERRED EMBODIMENTS

The present invention will become apparent from the following description of the preferred embodiments with reference to the accompanying drawings.

Figure 1:
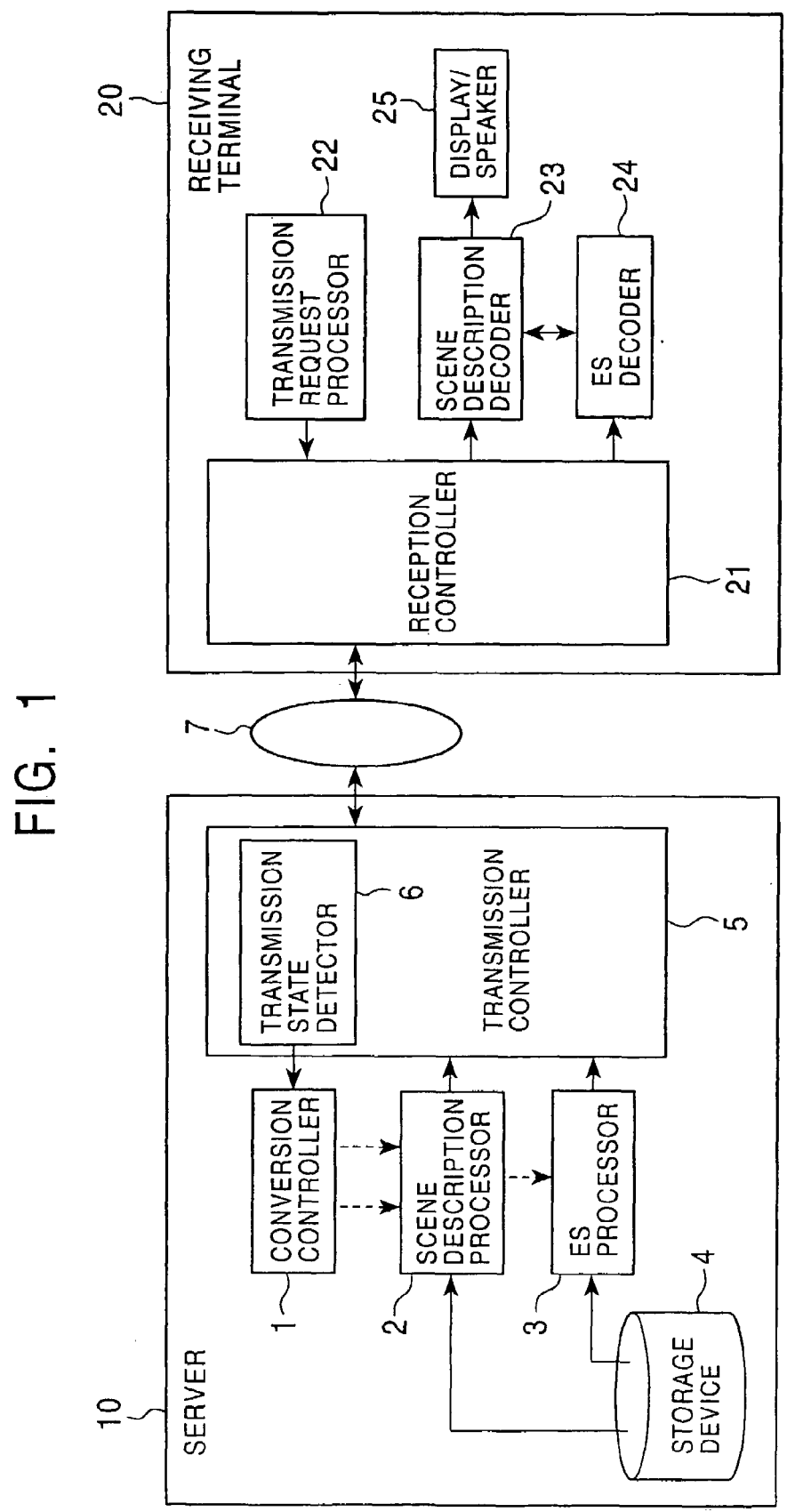
FIG. 1 is a block diagram showing the schematic configuration of a data delivery system according to a first embodiment of the present invention.

FIG. 1 shows an example of the configuration of a data delivery system according to a first embodiment of the present invention. Compared with the conventional data delivery system shown in FIG. 15, the data delivery system of the first embodiment shown in FIG. 1 includes a server 10 which includes a scene description processor 2; and a receiving terminal 20 which includes a scene description decoder 23 which decodes a scene description from the scene description processor 2 (by decoding the scene description and forming a scene). The scene description processing performed by the scene description processor 2 will be described in detail below.

Referring to FIG. 1, an ES processor 3 of the server 10 selects an ES which is stored beforehand in a storage device 4 or receives a baseband image or an audio signal (not shown), encodes the ES or the received signal, and generates an ES. A plurality of ES's may be selected. If necessary, a transmission controller 5 of the server 10 multiplexes a plurality of ES's and subjects them to transmission coding in accordance with a transmission protocol for transmitting signals over a transmission medium 7. The coded signals are transmitted to the receiving terminal 20.

A reception controller 21 of the receiving terminal 20 decodes the signals transmitted through the transmission medium 7 in accordance with the transmission protocol and transmits the signals to an ES decoder 24. If the ES's are multiplexed, the transmission protocol 21 separates the multiplexed ES's and passes each ES to the corresponding ES decoder 24. The ES decoder 24 decodes the ES and reconstructs the moving image signal or the audio signal. The image signal and the audio signal output from the ES decoder 24 are transmitted to the scene description decoder 23. The scene description decoder 23 forms a scene from the image signal and the audio signal in accordance with a scene description from the scene description processor 2 which is described below. The scene signals are transmitted to a display/speaker 25 which includes a television monitor and a speaker. Accordingly, the television monitor displays images, and the speaker outputs sound.

The server 10 includes a transmission system of a broadcasting station in broadcasting or an Internet server or a home server on the Internet. The receiving terminal 20 includes a receiving apparatus for receiving broadcast signals or a personal computer. Thus, the transmission medium 7 may be a transmission path dedicated for the broadcasting system or a high-speed communication channel on the Internet.

When a transmission bandwidth of a transmission path (transmission medium 7) for transmitting an ES changes or when the state of traffic congestion changes, data to be transmitted may be delayed or lost. In order to solve the above problems, the following processing is performed.

The server 10 (for example, the transmission controller 5) assigns a serial number (coded serial number) to each packet of data to be transmitted over the transmission path. At the same time, the reception controller 21 of the receiving terminal 20 performs a completeness check to see whether or not there is a missing serial number (coded serial number) assigned to each packet received from the transmission path, thereby detecting data loss (data loss ratio). Alternatively, the server 10 (for example, the transmission controller 5) adds time information (coded time information) to data to be transmitted over the transmission path. At the same time, the reception controller 21 of the receiving terminal 20 monitors the time information (coded time information) added to the data received from the transmission path, thereby detecting transmission delay based on the time information. The reception controller 21 of the receiving terminal 20 detects the data loss ratio of the transmission path or transmission delay and transmits (reports) the detected information to a transmission state detector 6 of the server 10.

The transmission state detector 6 of the server 10 detects the transmission bandwidth of the transmission path or the traffic congestion state from the data loss ratio of the transmission path or the information indicating the transmission delay which is transmitted from the reception controller 21 of the receiving terminal 20. Specifically, the transmission state detector 6 determines that the transmission path is congested if the data loss ratio is high. If the transmission delay is increased, the transmission state detector 6 determines that the transmission path is congested. If a reserved-band-type transmission path is used, the transmission state detector 6 can directly detect the free bandwidth (transmission bandwidth) available for the server 10. When a transmission medium such as radio waves which are greatly influenced by climate conditions is used, the transmission bandwidth may be preset by a user in accordance with climate conditions and the like. The information about the transmission state which is detected by the transmission state detector 6 is transmitted to a conversion controller 1.

Based on the detected information such as the transmission bandwidth of the transmission path or the traffic congestion state, the conversion controller 1 enables the ES processor 3 to select an ES having a different bit rate. When the ES processor 3 performs encoding in compliance with the ISO/IEC 13818 standard (socalled MPEG 2) or the like, the conversion controller 1 adjusts the coding bit rate. In other words, when it is detected that the transmission path is congested, the conversion controller 1 enables the ES processor 3 to output an ES having a low bit rate. As a result, data delay can be avoided.

For example, the system configuration may include an unspecified number of receiving terminals 20 connected to the server 10. When the receiving terminals 20 have different specifications, the server 10 must transmit an ES to the receiving terminals 20 which have various processing capacities. In such a case, the receiving terminals 20 each include a transmission request processor 22. The transmission request processor 22 generates a transmission request signal for requesting an ES which complies with the processing capacity of the receiving terminal 20, and the transmission request signal is transmitted from the reception controller 21 to the server 10. The transmission request signal includes a signal that indicates the capacity of the receiving terminal 20. For example, signals which are transmitted from the transmission request processor 22 to the server 10 and which indicate the capacity of the receiving terminal 20 include memory size, resolution of a display, computing capacity, buffer size, coding format of each decodable ES, the number of decodable ES's, bit rate of each decodable ES, and the like. The conversion controller 1 of the server 10 that has received the transmission request signal controls the ES processor 3 so that an ES that complies with the performance of the receiving terminal 20 is transmitted. Concerning an image signal converting process performed by the ES processor 3 to convert the ES so that the ES complies with the performance of the receiving terminal 20, an image signal converting method is proposed by the assignee of the present invention.

Figure 15:
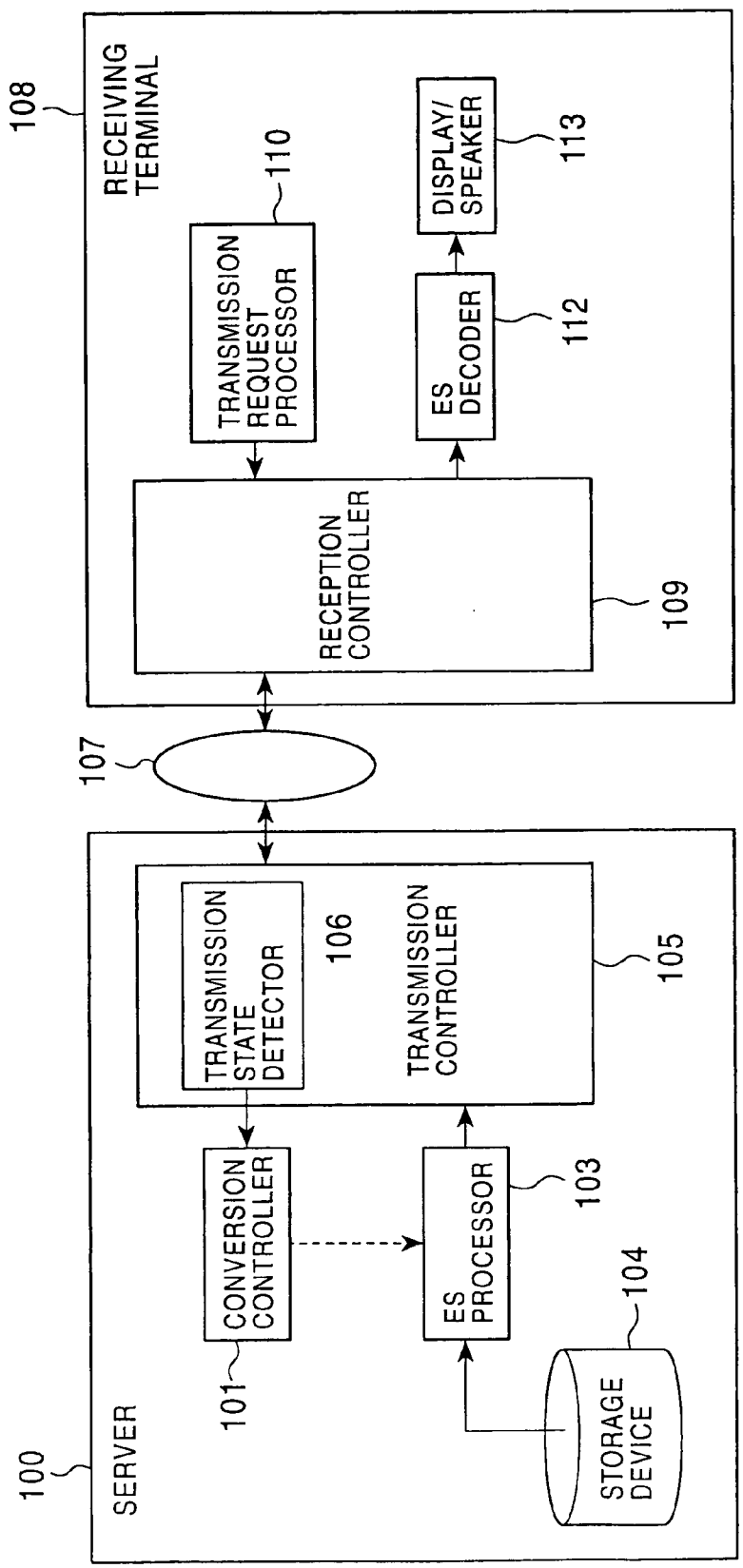
FIG. 15 is a block diagram showing the schematic configuration of a conventional data delivery system.

The configuration and the operation described so far are the same as the example shown in FIG. 15. However, in the data delivery system of the first embodiment, the conversion controller 1 of the server 10 controls not only the ES processor 3 but also the scene description processor 2 in accordance with the state of the transmission path, which is detected by the transmission state detector 6. When the receiving terminal 20 requests a scene description that complies with the coding and display performance thereof, the conversion controller 1 of the server 10 controls the ES processor 2 and the scene description processor 3 in accordance with a signal which indicates the capacity of the receiving terminal 20 and which is transmitted from the transmission request processor 22 of the receiving terminal 20. The conversion controller 1, the scene description processor 2, and the ES processor 3 can be integrated.

A selection method for selecting, by the ES processor 3 of the first embodiment, a specific ES to be transmitted from among a plurality of ES's under the control of the conversion controller 1 will now be described.

The server 10 of the first embodiment maintains transmission priority level information indicating a transmission priority level of each ES of a plurality of ES's. In accordance with the state of a transmission path over which ES's are to be transmitted or a request from the receiving terminal 20, the server 10 determines transmittable ES's in descending order of the transmission priority levels. Specifically, the conversion controller 1 of the server 10 of the first embodiment controls the ES processor 3 so that transmittable ES's are transmitted in descending order of the transmission priority levels, in accordance with the state of the transmission path over which the ES's are transmitted or the request from the receiving terminal 20. Although an example in which the conversion controller 1 maintains transmission priority level information has been described, transmission priority level information can be stored in the storage device 4.

Figures 2, 3:
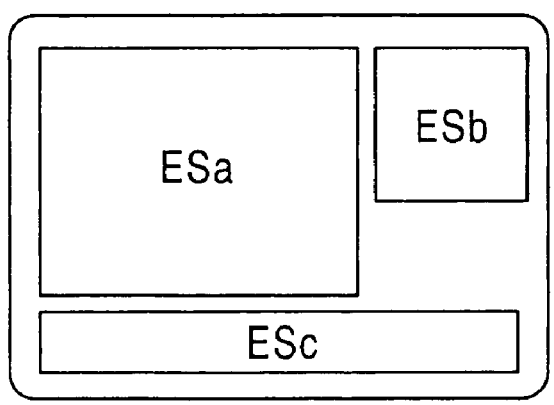
FIG. 2 is a table showing the relationships of three ES's with transmission priority levels, display priority levels, and bit rates.
FIG. 3 illustrates an example of a display when all three ES's shown in FIG. 2 are transmitted and a scene is formed in accordance with the display priority levels.

FIG. 2 illustrates examples of transmission priority levels in which there are three ES's, namely, ESa, ESb, and ESc. Specifically, the transmission priority level of ESa is "30"; the transmission priority level of ESb is "20"; and the transmission priority level of ESc is "10". The smaller the value, the higher the transmission priority level becomes. In FIG. 2, Ra indicates a transmission bit rate at which ESa is transmitted; Rb indicates a transmission bit rate at which ESb is transmitted; and Rc indicates a transmission bit rate at which ESc is transmitted.

In accordance with the state of the transmission path or the request from the receiving terminal 20, the transmissible bit rate R is determined. In such a case, the conversion controller 1 controls the ES processor 3 to select and transmit ES's in descending order of the transmission priority levels, within a limit of the transmissible bit rate R.

More specifically, for example, when the relationship between the transmissible bit rate R and the transmission bit rate of each ES is expressed by expression (1) below, the conversion controller 1 controls the ES processor 3 to only select and transmit the ESc with the highest transmission priority level:

$$Rc \leq R < (Rc+Rb) \quad (1)$$

For example, when the relationship between the transmissible bit rate R and the transmission bit rate of each ES is expressed by expression (2) below, the conversion controller 1 controls the ES processor 3 to select and transmit the ESc with the highest transmission priority level and the ESb with the next (second) highest transmission priority level:

$$(Rc+Rb) \leq R < (Rc+Rb+Ra) \quad (2)$$

For example, when the relationship between the transmissible bit rate R and the transmission bit rate of each ES is expressed by expression (3) below, the conversion controller 1 controls the ES processor 3 to select and transmit all the ES's:

$$(Rc+Rb+Ra) \leq R \quad (3)$$

According to the data delivery system of the first embodiment, the server 10 (conversion controller 1) maintains transmission priority level information of each ES and, in accordance with the state of the transmission path over which ES's are transmitted and the request from the receiving terminal 20, determines transmissible ES's in descending order of the transmission priority levels. Thus, an important ES or ES's can be selected and transmitted preferentially from among a plurality of ES's.

Under the control of the conversion controller 1, the scene description processor 2 of the first embodiment performs the following scene description processing.

The server 10 of the first embodiment maintains display priority level information indicating the priority level of each ES of a plurality of ES's for the receiving terminal 20 which decodes and displays the ES. The server 10 outputs a scene description that assigns a display region to each ES to be transmitted in descending order of the display priority levels. Specifically, the conversion controller 1 of the server 10 of the first embodiment controls the scene description processor 2 so that a scene description that assigns a display region to each ES to be transmitted in descending order of the display priority levels is output. Although an example in which the conversion controller 1 maintains display priority level information has been described, display priority level information can be stored in the storage device 4.

Referring back to FIG. 2, examples of display priority levels when there are three ES's, namely, ESa, ESb, and ESc, are shown. In other words, the display priority level of ESa is "10"; the display priority level of ESb is "20"; and the display priority level of ESc is "30". The smaller the value, the higher the display priority level becomes.

When the display priority levels are reflected in a display region of a scene displayed by the receiving terminal 20, the conversion controller 1 controls the scene description processor 2 to output a scene description that assigns a larger display region to an ES with a higher display priority level.

Specifically, when all the ES's, namely, ESa, ESb, and ESc, shown in FIG. 2 are to be transmitted, as shown in FIG. 3, the conversion controller 1 controls the scene description processor 2 to output a scene description that assigns a larger display region to ESa with the highest display priority level compared with the remaining ESb and ESc.

Figure 4:
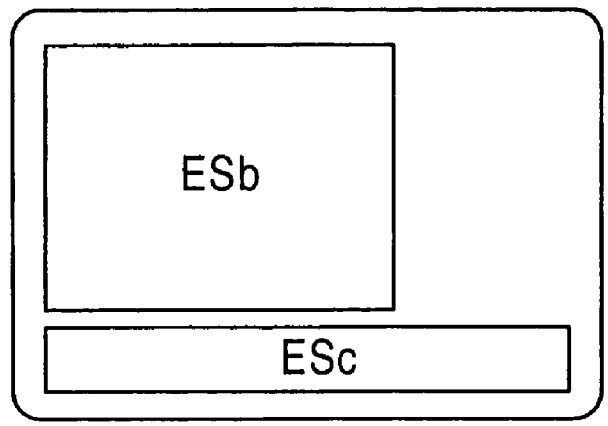
FIG. 4 illustrates an example of a display when two of the ES's, namely, ESb and ESc, shown in FIG. 2 are transmitted and a scene is formed in accordance with the display priority levels.

When two ES's, namely, ESb and ESc, shown in FIG. 2 are to be transmitted, as shown in FIG. 4, the conversion controller 1 controls the scene description processor 2 to output a scene description that assigns a larger display region to ESb which has a higher display priority level than ESc.

Figure 5:
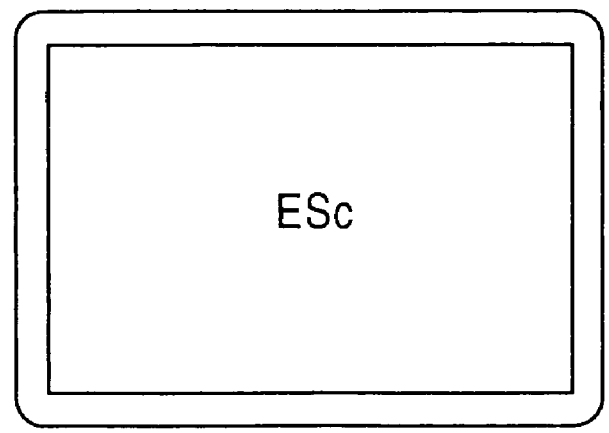
FIG. 5 illustrates an example of a display when only ESc shown in FIG. 2 is transmitted and a scene is formed in accordance with the display priority level.

When only ESc shown in FIG. 2 is to be transmitted, as shown in FIG. 5, the conversion controller 1 controls the scene description processor 2 to output a scene description that assigns the entire display region to ESc.

For an ES such as a moving image or a still image which has its own frame (display frame) and for which changing of the aspect ratio of the display region is discouraged, a scene description that maintains the aspect ratio of the frame can be output. When the aspect ratio of a frame is to be maintained as in this case, the relationship between the display region of the ES in which the aspect ratio of the frame is to be maintained and the display region of each of the remaining ES's may not comply with the display priority levels. Specifically, FIGS. 3 and 4 show examples in which the aspect ratio of each frame of ESa and ESb is maintained. In particular, in the example shown in FIG. 3, since the aspect ratio of the frame of ESb is maintained, the display region of ESb is smaller than that of ESc which has a lower display priority level. FIG. 6 shows an example of a scene description which is written in HTML format and which describes the scene structure shown in FIG. 3. In the example shown in FIG. 6, ESa and ESb are still images, and ESc is text. The text contents are omitted.

In the above description, a case in which the display priority levels are reflected in the display region has been described. Alternatively, for example, the display priority levels can be reflected in display positions in a scene displayed by the receiving terminal 20. When reflecting the display priority levels in display positions, the conversion controller 1 controls the scene description processor 2 to output a scene description that assigns each ES to a predetermined display position in accordance with the corresponding display priority level. In the examples shown in FIGS. 3 to 5, the higher the position on the screen, the higher the display priority level becomes, and the more leftward the position, the higher the display priority level becomes.

It is also possible to determine the display regions and the display positions based on the display priority levels. By determining the display regions and the display positions based on the display priority levels, it is possible to generate a scene description that displays ES's in descending order of importance in which an ES with a higher priority level is displayed in a larger display region of a scene, at a more preferential display position.

The above-described scene description processing performed by the scene description processor 2 of the first embodiment can be implemented by selectively reading and transmitting, from among a plurality of scene descriptions which are stored beforehand in the storage device 4, a scene description that complies with the display priority level of the ES, by receiving a scene description which is read from the storage device 4 and converting it into a scene description that complies with the display priority level of the ES, or by generating or coding scene description data upon transmission in accordance with the display priority level of the ES and outputting the scene description data.

In the above description, an example in which an ES is selected or a scene description is converted based on a predetermined priority level has been described. Alternatively, the priority level can be changed in connection with the conversion of the ES. In such a case, the priority level is changed by, for example, the ES processor 3.

Figures 7, 8:
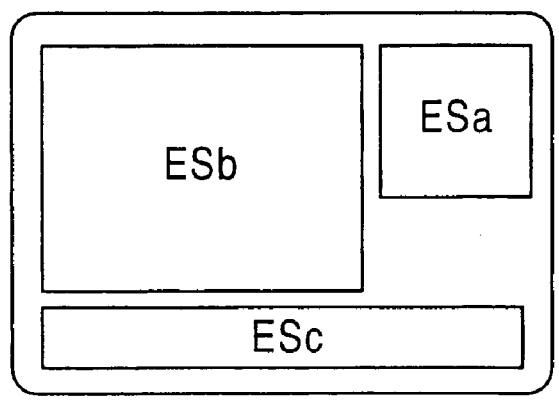
FIG. 7 is a table showing examples of a transmission priority level and a display priority level which are both converted in connection with the conversion of the bit rate of ESa to Ra'.
FIG. 8 illustrates an example of a display when all the three ES's shown in FIG. 7 are transmitted and a scene is formed in accordance with the display priority levels.

FIG. 7 shows examples of transmission priority levels and display priority levels which are changed by the ES processor 3 in connection with the conversion of the bit rate of ESa into Ra'. FIG. 7 shows a case in which the bit rate of ESa is converted to the bit rate Ra' which is lower than the bit rate Ra shown in FIG. 2. Accordingly, the transmission priority level is converted to a high level (the transmission priority level is converted from "30" in FIG. 2 to "15" in FIG. 7). In order to suppress or minimize deterioration of image quality, which is expected to be caused by reducing the bit rate, the display priority level of ESa is converted to a low level (the display priority level is converted from "10" in FIG. 2 to "25" in FIG. 7).

In the example shown in FIG. 7, when all three ES's, namely, ESa, ESb, and ESc, are to be transmitted, as shown in FIG. 8, a larger display region and a more preferential display position are assigned to ESb which has the highest display priority level compared with the remaining ESa and ESc.

In this example, when the server 10 converts the ES in accordance with the state of the transmission path or the request from the receiving terminal 20, the server 10 also converts the display priority level, thereby generating a scene description based on the level of importance in accordance with the conversion of the ES. It is not necessary to change the priority level every time the ES is converted by the ES processor 3. Instead, as described above, only the predetermined priority levels can be used.

Apart from a case in which the server 10 maintains predetermined values as the transmission priority levels and the display priority levels, the transmission priority levels and the display priority levels can be set in accordance with coding parameters such as the bit rate and frame of the ES.

Figure 9:
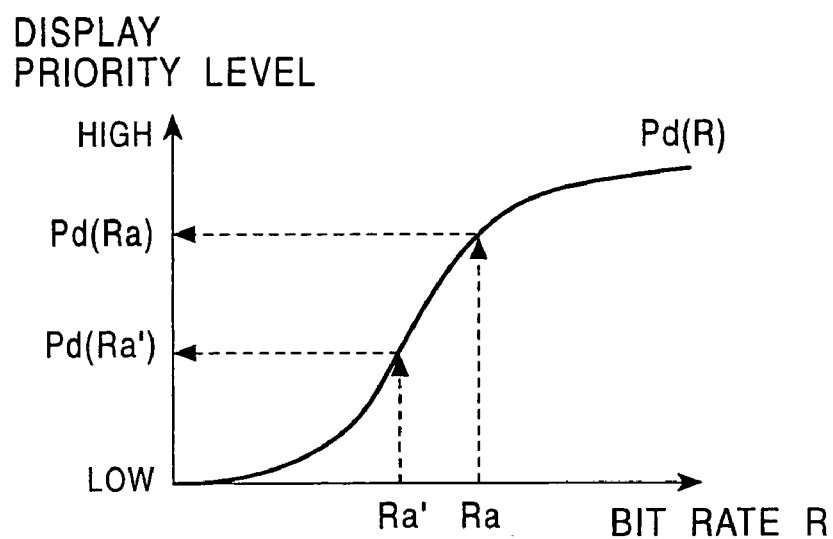
FIG. 9 is a graph showing the relationship Pd(R) between the bit rate R and the display priority level of an ES.

For example, as shown in FIG. 9, when the relationship Pd(R) between the bit rate R of the ES and the display priority level is maintained, the display priority level can be set in accordance with the bit rate of the ES. Specifically, referring to FIG. 9, in general, the higher the bit rate of the ES, the better the image quality becomes. Taking this point into consideration, the higher the bit rate of the ES, the higher the display priority level to be set. It is thus possible to assign a larger display region or a more preferential display position to an ES with a higher bit rate.

Figure 10:
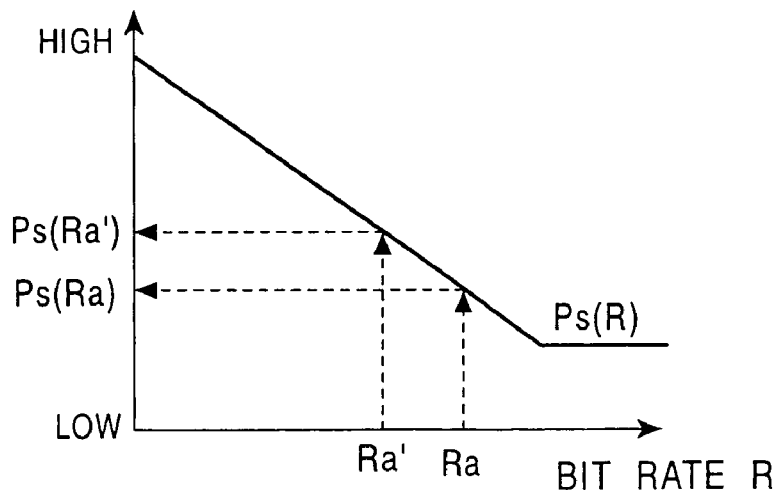
FIG. 10 is a graph shooing the relationship Ps(R) between the bit rate R and a transmission priority level of the ES.

Referring to FIG. 10, when the relationship Ps(R) between the bit rate R of the ES and the transmission priority level is maintained, the transmission priority level can be set in accordance with the bit rate of the ES. Specifically, for example, the higher the bit rate, the more expensive the transmission cost becomes. As in the example shown in FIG. 10, the higher the bit rate of the ES, the lower the transmission priority level to be assigned. Accordingly, an ES which requires a lower transmission cost (which has a lower bit rate) is preferentially transmitted.

Figure 11:
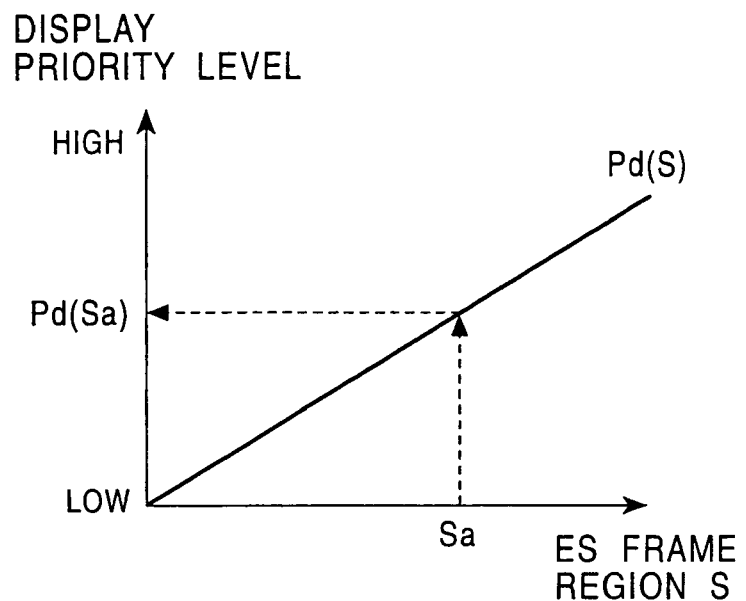
FIG. 11 is a graph showing the relationship Pd(S) between the frame region S and the display priority level of the ES.

When an ES such as image data has its own explicit frame, it is possible to set the transmission priority level and the display priority level in accordance with the frame. For example, as shown in FIG. 11, when the relationship Pd(S) between the frame region S of the ES and the display priority level is maintained, the display priority level can be set in accordance with the frame. The frame region is an area enclosed by the frame of the ES. The frame region can be expressed in pixels. In the example shown in FIG. 11, the larger the frame of the ES, the higher the display priority level to be set. It is thus possible to assign a larger display region or a more preferential display position in a scene to an ES that has a larger frame.

Figure 12:
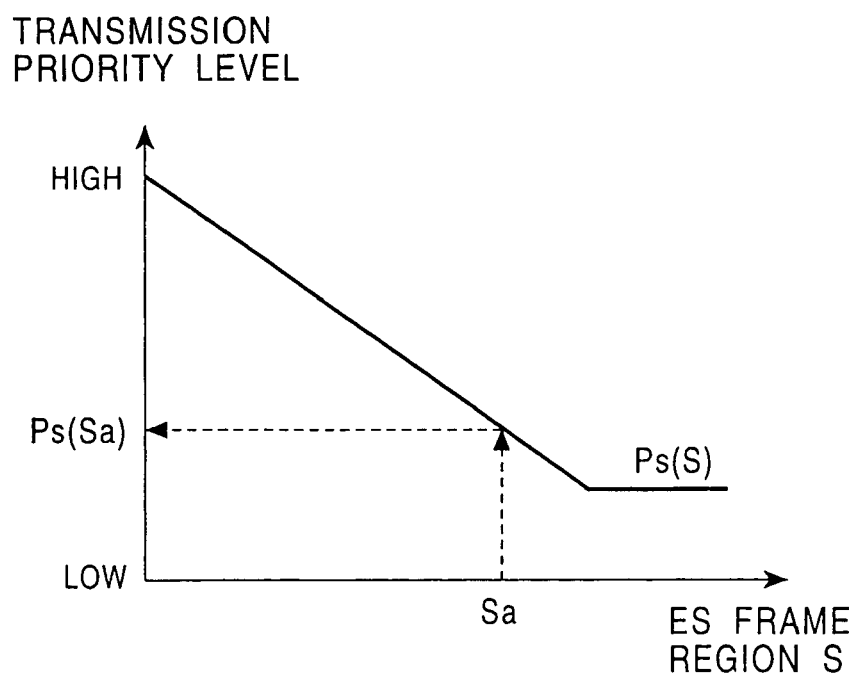
FIG. 12 is a graph showing the relationship Ps(S) between the frame region S and the transmission priority level of the ES.

Similarly, FIG. 12 shows an example of the relationship Ps(S) between the frame region S of the ES and the transmission priority level. By maintaining the relationship Ps(S) between the frame region S and the transmission priority level, the transmission priority level can be set in accordance with the frame of the ES. Specifically, in general, the larger the frame, the more expensive the transmission cost becomes. In the example shown in FIG. 12, the larger the frame, the lower the transmission priority level to be assigned. It is thus possible to preferentially transmit an ES which is expected to require a lower transmission cost.

As described above, the method for setting the display priority level and the transmission priority level in accordance with the coding parameters such as the bit rate and the frame of the ES can be used to change the display priority level and the transmission priority level in connection with the conversion of the ES by the ES processor 3. For example, when the ES processor 3 converts the bit rate the ES from the bit rate Ra to the bit rate Ra', as shown in FIG. 9, the display priority level is changed to Pd(Ra'), and, as shown in FIG. 10, the transmission priority level is changed to Ps(Ra').

Also, the transmission priority level and the display priority level can be assigned according to the type of ES, such as a moving image, a still image, or text, or according to the coding format of the ES. For example, if the highest transmission priority level is always assigned to text, text data can be preferentially transmitted even when the transmissible bit rate is limited in accordance with the state of the transmission path or the request from the receiving terminal 20. If the highest display priority level is always assigned to a moving image ES, the moving image is always displayed in a large display region whenever a moving image is transmitted.

Also, the transmission priority level and the display priority level can be determined based on the user's preferences. Specifically, when the server 10 maintains preference information including the type of the user's favorite ES, such as a moving image, a still image, or text, and the user's favorite coding format and coding parameter of the ES, it is possible to assign a high transmission priority level and a high display priority level to an ES which is of the user's favorite type, which is in the user's favorite coding format, and which has the user's favorite coding parameter. Accordingly, even when the transmissible bit rate is limited in accordance with the state of the transmission path or the request from the receiving terminal 20, it is possible to preferentially transmit an ES which complies with the user's preferences and to display such an ES in a large display region.

Also, the transmission priority level and the display priority level can be determined using a combination of a plurality of the foregoing evaluation criteria. Also, the transmission priority level and the display priority level can be in common with each other. When the transmission priority level and the display priority level are separately provided, the following processing can be performed. Specifically, for example, when there are a moving image ES and a text ES which both indicate the same semantic content, and when the transmission path has a low bit rate, text information is preferentially transmitted; when there is a transmissible bandwidth in which the moving image ES can be transmitted, the transmitted moving image ES is displayed in a large display region.

According to the first embodiment of the present invention, the server 10 maintains transmission priority level information of each ES and determines transmissible ES's in descending order of the transmission priority levels in accordance with the state of a transmission path over which transmission is performed or a request from the receiving terminal 20, thereby preferentially transmitting important ES's. According to the first embodiment, the server 10 maintains a display priority level of each ES and determines a scene description in accordance with the display priority level of an ES to be transmitted, thereby generating a scene description that displays a scene in which the level of importance of each ES is reflected. According to the first embodiment, the server 10 converts the display priority level whenever the ES is converted, thereby generating a scene description based on the level of importance in accordance with the conversion of the ES.

Figure 13:
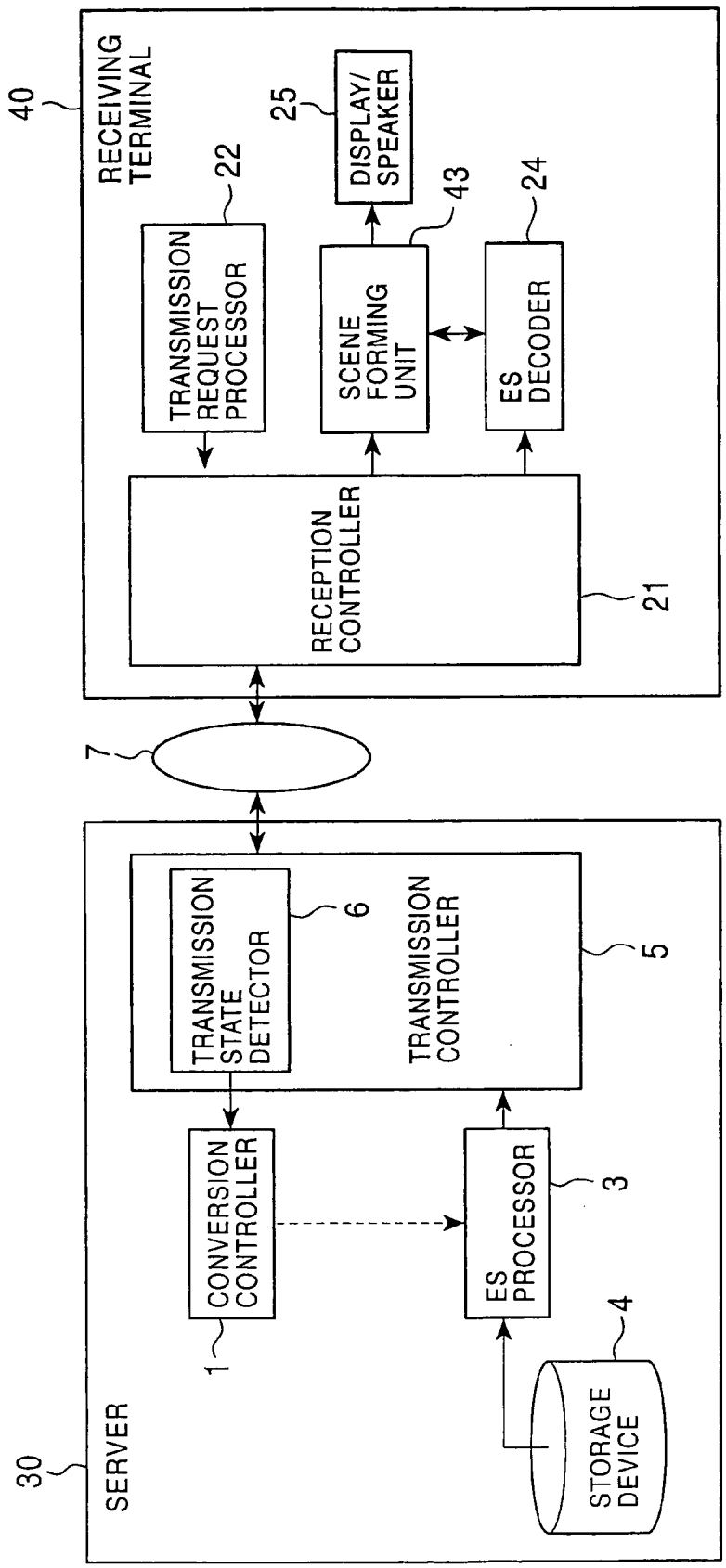
FIG. 13 is a block diagram showing the schematic configuration of a data delivery system according to second and third embodiments of the present invention.

FIG. 13 shows a data delivery system according to a second embodiment of the present invention. Referring to FIG. 13, the same reference numerals are given to components corresponding to those in FIG. 1, and repeated descriptions of the common portions are omitted.

A server 30 of the data delivery system of the second embodiment does not include a scene description processor, and hence the server 30 does not transmit a scene description to a receiving terminal 40. The server 30 of the data delivery system transmits an ES and its display priority level information. The server 30 of the data delivery system of the second embodiment is basically the same as the server 10 of the data delivery system shown in FIG. 1 except for the point that the server 30 does not transmit a scene description and that the server 30 transmits display priority level information. The receiving terminal 40 of the data delivery system of the second embodiment includes a scene forming unit 43 instead of receiving and decoding a scene description. The scene forming unit 43 forms a scene based on display priority levels and displays the scene.

A scene formed by the scene forming unit 43 is equivalent to that rendered by a scene description output from the scene description processor 2 of the server 10 of the first embodiment. Thus, a method for forming a scene based on display priority levels is the same as the scene description processing method described in the first embodiment.

According to the second embodiment, since the server 30 does not transmit scene description data, the structure of the server 30 is simplified compared with that of the server 10 shown in FIG. 1, and the transmission capacity required for the scene description data can be saved.

According to the second embodiment, since the receiving terminal 40 is designed to form a scene, it is possible to form a scene in accordance with the processing capacity of the receiving terminal 40. Specifically, the scene forming unit 43 sequentially obtains ES's in descending order of the display priority levels, within a limit of the processing capacity of the receiving terminal 40. If an ES exceeds the processing capacity of the receiving terminal 40, the receiving terminal 40 does not obtain the ES. It is thus possible to form a scene in accordance with the processing capacity of the receiving terminal 40. In particular, when an ES decoder 24 and the scene forming unit 40 of the receiving terminal 40 are formed by software, and when the software shares a CPU and memory with the other processing software which performs processing other than decoding, the processing capacities of the ES decoder 24 and the scene forming unit 43 dynamically vary. According to the second embodiment, the scene forming unit 43 forms the optimal scene in accordance with the processing capacity of the receiving terminal 40. As a result, a scene that complies with the processing capacity of the receiving terminal 40 is dynamically formed.

A data delivery system according to a third embodiment of the present invention will now be described. The configuration of the data delivery system of the third embodiment is similar to that shown in FIG. 13. According to the third embodiment, the server 30 does not transmit display priority levels to the receiving terminal 40.

Instead of receiving display priority levels, the scene forming unit 43 included in the receiving terminal 40 of the data delivery system of the third embodiment forms a scene based on pre-possessed display priority levels or sets display priority levels and forms a scene. A method for setting display priority levels is the same as the display priority level setting method performed by the server 10 of the first embodiment.

According to the third embodiment in which display priority levels are set at the receiving terminal 40 side, the server 30 does not have to process display priority levels, and hence the structure of the server 30 is simplified. According to the third embodiment, since display priority levels and scene descriptions are not transmitted, the transmission capacity required for such information is saved. According to the third embodiment, since a scene is formed by the receiving terminal 40, it is possible to form a scene in accordance with the processing capacity of the receiving terminal 40. In a data delivery system in which a plurality of receiving terminals 40 is connected to the server 30, scenes can be formed and displayed in accordance with settings which differ according to the receiving terminals 40.

According to the second and third embodiments of the present invention, the data delivery system in which the server 30 does not transmit scene descriptions to the receiving terminal 40 has been described. Display priority levels are transmitted, or display priority levels are set by the receiving terminal 40. Without transmitting a scene description, the data delivery system can perform display at the receiving terminal 40 side in accordance with the display priority level of each ES.

Figure 14:
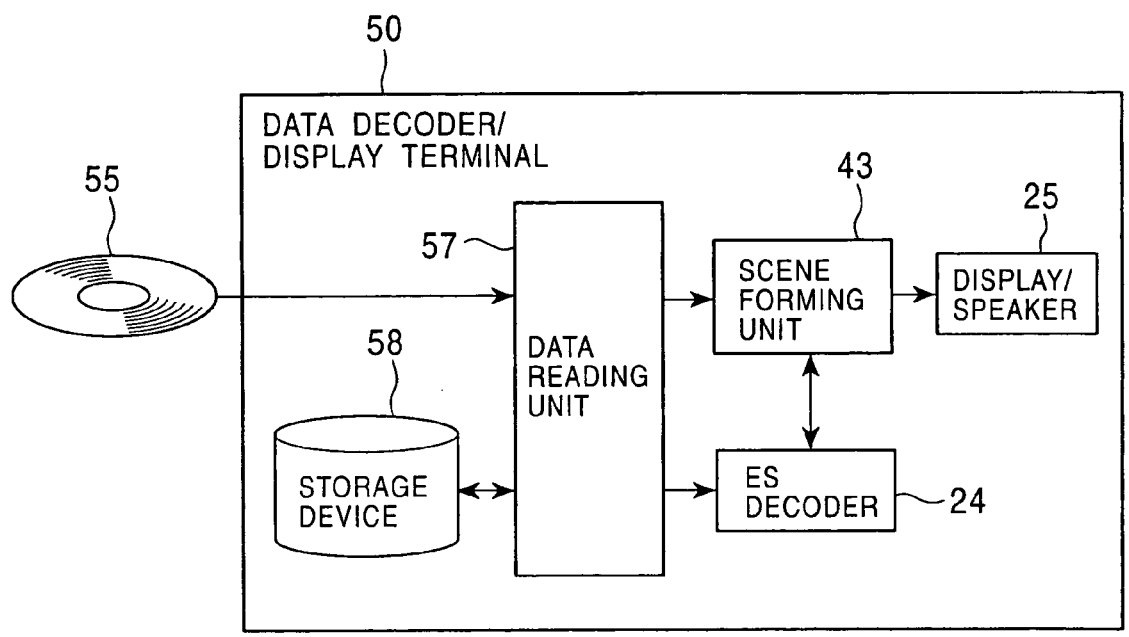
FIG. 14 is a block diagram showing the schematic configuration of a data delivery system according to fourth and fifth embodiments of the present invention.

A fourth embodiment of the present invention will now be described. FIG. 14 shows an example of a data decoder/display terminal of the fourth embodiment. Referring to FIG. 14, the same reference numerals are given to components corresponding to those in FIG. 13, and repeated descriptions of the common portions are omitted.

According to the fourth embodiment, unlike the foregoing first to third embodiments, data is not transmitted through a transmission medium. Instead, in a data decoder/display terminal 50, data recorded in a recording medium 55 or data stored in a storage device 58 is read by a data reading unit 57, and the read data is transmitted to the ES decoder 24.

In the recording medium 55 and the storage device 58, an ES and its display priority level information are recorded. The data reading unit 57 reads the display priority level information and transmits the information to the scene forming unit 43. The scene forming unit 43 is the same as that of the second embodiment. The scene forming unit 43 forms a scene based on the display priority level.

According to the fourth embodiment, scene description data is not recorded in the recording medium 55 or in the storage device 58. Thus, the transmission capacity required for the scene description data can be saved.

According to the fourth embodiment, since the data decoder/display terminal 50 forms a scene, it is possible to form a scene in accordance with the processing capacity of the data decoder/display terminal 50. Specifically, as in the second embodiment, the scene forming unit 43 sequentially obtains ES's in descending order of the display priority levels, within a limit of the processing capacity of the data decoder/display terminal 50. If an ES exceeds the processing capacity of the data decoder/display terminal 50, the ES is not incorporated into a scene. It is thus possible to form a scene in accordance with the processing capacity of the data decoder/display terminal 50. In particular, if the ES decoder 24 and the scene forming unit 43 of the data decoder/display terminal 50 are formed by software, or if the software shares a CPU and memory with the other processing software which performs processing other than decoding, the processing capacities of the ES decoder 24 and the scene forming unit 43 dynamically vary. According to the fourth embodiment, the scene forming unit 43 forms the optimal scene in accordance with the processing capacity of the data decoder/display terminal 50. As a result, a scene is dynamically formed in accordance with the processing capacity of the data decoder/display terminal 50.

A fifth embodiment of the present invention will now be described. The structure of a data decoder/display terminal of the fifth embodiment is similar to that shown in FIG. 14. According to the fifth embodiment, display priority levels are not recorded in the recording medium 55 or in the storage device 58.

As in the scene forming unit 43 of the third embodiment, instead of receiving display priority levels, the scene forming unit 43 included in the data decoder/display terminal 50 of the fifth embodiment forms a scene based on pre-possessed display priority levels or sets display priority levels and forms a scene. A method for setting display priority levels is the same as the display priority level setting method performed by the server 10 of the first embodiment.

According to the fifth embodiment in which display priority levels are set at the data decoder/display terminal 50 side, it is not necessary to preset display priority levels when storing ES's in the recording medium 55 or in the storage device 58. According to the fifth embodiment, since display priority levels are not recorded in the recording medium 55 or in the storage device 58, the transmission capacity required for such information can be saved. According to the fifth embodiment, since the data decoder/display terminal 50 forms a scene, it is possible to form a scene in accordance with the processing capacity of the data decoder/display terminal 50. When the same data is to be decoded and displayed by a plurality of data decoding/display terminals 50, it is possible to form scenes in accordance with settings which differ according to the data decoder/display terminals 50.

According to the fourth and fifth embodiments of the present invention, the data decoder/display terminal 50 for reading ES's recorded in the recording medium 55 or in the storage device 58 and for decoding and displaying the ES's has been described. Display priority levels which are recorded in connection with ES's are read, or display priority levels are set by the data decoder/display terminal 50. Based on the display priority levels, a scene is formed and displayed. As a result, the optimal scene can be formed and displayed in accordance with the display priority levels of the ES's and the processing capacity of the data decoder/display terminal 50.

As described above, according to the first to fourth embodiments of the present invention, the priority level of an ES is set based on the processing capacity of a receiving terminal or a data decoder/display terminal, the bit rate of the ES, the user's preference information, and the frame of the ES. Even when the display priority level and the transmission priority level are not fixedly assigned to each ES, it is possible to set the priority level of the ES.

Although a scene description written by using HTML format has been described as an example of a scene description, the present invention is not limited to this example. For example, the present invention is applicable to various scene describing methods using MEPG-4, BIFS, VRML, and Java (trademark).

The foregoing embodiments of the present invention can be implemented by hardware or by software.

What is claimed is:

1. A transmission apparatus for transmitting to a receiving apparatus at least two different signals and a scene description which describes a scene formed of said at least two different signals, comprising:
   maintaining means for maintaining priority level information indicating transmission priority levels with respect to said at least two different signals;
   determining means for determining, in accordance with the state of a transmission path and/or a request from said receiving apparatus, signals to be transmitted based on the priority level information; and
   scene description converting means for converting the scene description in accordance with the signals to be transmitted.

2. A transmission apparatus according to claim 1, wherein said determining means determines the signals to be transmitted in descending order of the priority levels.

3. A transmission apparatus according to claim 1, wherein said scene description converting means converts the scene description so that a larger display region and/or a more highly preferential display position is assigned to the signals to be transmitted in descending order of the priority levels.

4. A transmission apparatus according to claim 1, further comprising priority level determining means for determining the priority level of each of said at least two different signals in accordance with the type of signal.

5. A transmission apparatus according to claim 1, wherein said determining means determines only the signal that complies with the processing capacity of said receiving apparatus based on the priority level information.

6. A transmission apparatus according to claim 1, wherein said maintaining means also maintains information indicating display priority levels with respect to said at least two different signals.

7. A transmission method for transmitting to a receiving apparatus at least two different signals and a scene description which describes a scene formed of said at least two different signals, comprising:
   a maintaining step of maintaining, in a memory, priority level information indicating transmission priority levels with respect to said at least two different signals;
   a determining step of determining, in accordance with the state of a transmission path and/or a request from said receiving apparatus, signals to be transmitted based on the priority level information; and
   a scene description converting step of converting the scene description in accordance with the signals to be transmitted.

8. A transmission method according to claim 7, wherein, in said determining step, the signals to be transmitted are determined in descending order of the priority levels.

9. A transmission method according to claim 7, wherein, in said scene description converting step, the scene description is converted so that a larger display region and/or a more highly preferential display position is assigned to the signals to be transmitted in descending order of the priority levels.

10. A transmission method according to claim 7, further comprising a priority level determining step of determining the priority level of each of said at least two different signals in accordance with the type of signal.

11. A transmission method according to claim 7, wherein, in said determining step, only the signal that complies with the processing capacity of said receiving apparatus is determined based on the priority level information.

12. A transmission method according to claim 7, wherein the memory also maintains information indicating display priority levels with respect to said at least two different signals.

13. A transmission system comprising:
   a transmission apparatus for transmitting at least two different signals and a scene description which describes a scene formed of said at least two different signals; and
   a receiving apparatus for receiving the transmitted signals and the scene description;
   wherein said transmission apparatus comprises:
      maintaining means for maintaining priority level information indicating transmission priority levels with respect to said at least two different signals;
      determining means for determining, in accordance with the state of a transmission path or a request from said receiving apparatus, signals to be transmitted based on the priority level information; and
      scene description converting means for converting the scene description in accordance with the signals to be transmitted; and
   said receiving apparatus comprises:
      forming means for forming a scene based on the received signals and the scene description.

\* \* \* \* \*